US010231007B2

(12) United States Patent
Kitazato et al.

(10) Patent No.: US 10,231,007 B2
(45) Date of Patent: Mar. 12, 2019

(54) TRANSMISSION DEVICE, TRANSMITTING METHOD, RECEPTION DEVICE, AND RECEIVING METHOD

(71) Applicant: SATURN LICENSING LLC, New York, NY (US)

(72) Inventors: Naohisa Kitazato, Tokyo (JP); Jun Kitahara, Shizuoka (JP); Kazuyuki Takahashi, Chiba (JP)

(73) Assignee: SATURN LICENSING LLC, New York, NY (US)

(*) Notice: Subject to any disclaimer, the term of this patent is extended or adjusted under 35 U.S.C. 154(b) by 99 days.

(21) Appl. No.: 15/113,383

(22) PCT Filed: Jan. 13, 2015

(86) PCT No.: PCT/JP2015/050695
§ 371 (c)(1),
(2) Date: Jul. 21, 2016

(87) PCT Pub. No.: WO2015/115171
PCT Pub. Date: Aug. 6, 2015

(65) Prior Publication Data
US 2017/0013303 A1 Jan. 12, 2017

(30) Foreign Application Priority Data

Jan. 31, 2014 (JP) .................. 2014-017164

(51) Int. Cl.
*H04H 60/40* (2008.01)
*H04N 21/236* (2011.01)
(Continued)

(52) U.S. Cl.
CPC ........ *H04N 21/4305* (2013.01); *H04H 60/40* (2013.01); *H04N 21/236* (2013.01);
(Continued)

(58) Field of Classification Search
None
See application file for complete search history.

(56) References Cited

U.S. PATENT DOCUMENTS 5,841,987 A * 11/1998 Blatter ................ H04N 5/4401
709/236
6,236,694 B1 * 5/2001 Blatter ................ H04N 5/4401
348/423.1
(Continued)

FOREIGN PATENT DOCUMENTS

EP 0 942 597 A2 9/1999
EP 0 942 597 A3 9/1999
(Continued)

OTHER PUBLICATIONS

Park et al., "Study of ISO/IEC CD 23008-1 MPEG Media Transport", ISO/IEC JTC1/SC29/WG11, pp. 1-125, Oct. 12.*
(Continued)

*Primary Examiner* — Reza Aghevli
(74) *Attorney, Agent, or Firm* — Oblon, McClelland, Maier & Neustadt, L.L.P.

(57) ABSTRACT

Clock synchronization and presentation synchronization are appropriately achieved in the case where transmission is performed by carrying, on a broadcast signal, a transmission media packet obtained by fragmenting transmission media such as video and audio.
A clock of 27 MHz synchronized with time information acquired from a time information server is generated. Time information including frequency information of the clock of 27 MHz and synchronized with the time information acquired from the time information server is generated. A transmission medium is encoded. The encoded transmission medium is fragmented in a predetermined unit, and a transmission media packet including each fragment is generated. A stream that includes, on time division basis, the transmis- (Continued)

sion media packet, a packet including the time information, and a packet having a control signal is carried on a broadcast wave and transmitted.

15 Claims, 15 Drawing Sheets

(51) Int. Cl.
| | |
|---|---|
| *H04N 21/242* | (2011.01) |
| *H04N 21/43* | (2011.01) |
| *H04N 21/64* | (2011.01) |
| *H04N 21/84* | (2011.01) |
| *H04N 21/85* | (2011.01) |
| *H04N 21/4385* | (2011.01) |
| *H04N 21/643* | (2011.01) |
| *H04N 21/845* | (2011.01) |
| *H04N 21/854* | (2011.01) |

(52) U.S. Cl.
CPC ....... *H04N 21/242* (2013.01); *H04N 21/4385* (2013.01); *H04N 21/64322* (2013.01); *H04N 21/8456* (2013.01); *H04N 21/85406* (2013.01)

(56) References Cited

U.S. PATENT DOCUMENTS

| | | | |
|---|---|---|---|
| 6,356,212 B1* | 3/2002 | Lyons | H04N 7/52 341/60 |
| 2002/0100064 A1 | 7/2002 | Ward et al. | |
| 2003/0190139 A1 | 10/2003 | Ishiguro et al. | |
| 2004/0012510 A1* | 1/2004 | Chen | H04N 21/23608 341/50 |
| 2005/0089066 A1* | 4/2005 | Soga | H04N 11/042 370/498 |
| 2006/0209966 A1* | 9/2006 | Walker | H04N 5/06 375/240.25 |
| 2013/0125187 A1* | 5/2013 | Kim | H04N 21/23608 725/109 |

FOREIGN PATENT DOCUMENTS

| | | |
|---|---|---|
| JP | 2011-193058 A | 9/2011 |
| WO | 2014/188960 A | 11/2014 |
| WO | 2014/188960 A1 | 11/2014 |

OTHER PUBLICATIONS

Kyungmo Park et al., "Study of ISO/IEC CD 23008-1 MPEG Media Transport", International Organization for Standardization Organisation Internationale De Normalisation ISO/IEC JTC1/SC29/WG11 Coding of Moving Pictures and Audio, MPEG/N13089, STD Version 2.102, Shanghai, China, Oct. 2012, 16 pages.

Kameyama et al., IPTV Jidai no Digital Hoso Kyokasho, 1st edition, 1st print, Kabushiki Kaisha Impress R&D, Apr. 1, 2010, 9 pages.

International Standard, "Information technology—Coding of audiovisual objects—Part 12: ISO base media file format", Reference No. ISO/IEC 14496-12, Fourth edition (Corrected version), Sep. 15, 2012, 9 pages.

ISO/IEC 14496-12 Information Technology—Coding of Audio-Visual Objects—Part 12: ISO Base Media File Format, Sep. 15, 2012, pp. 54-60.

Park, et al., "Study of ISO/IEC CD 23008-1 MPEG Media Transport", ISO/IEC JTC1/SC29/WG11 MPEG/N13089, Oct. 2012, 16 pages.

Kameyama, et al., "IPTV Jidai no Digital Hoso Kyokasho", 1st Print, Kabushiki Kaisha Impress R&D, Apr. 1, 2010, pp. 67-70 , 74 to 76.

Extended European Search Report dated Jul. 11, 2017 in Patent Application No. 15742912.7.

"MPEG transport stream," Wikipedia, XP002771611, 2013, pp. 1-8.

* cited by examiner

FIG. 5

| Media segment | | | |
|---|---|---|---|
| segment type | Segment index | Movie Fragment | Movie Fragment |
| styp 'msdh' | sidx | moof [traf [tfdt]] mdat | moof mdat | ...

FIG. 6

```
MPD
  @type="dynamic"
  @publishTime="2013-12-01T10:29:00"
  @availabilityStartTime="2013-12-01T10:30:00"
  @availabilityEndTime="2013-12-01T10:59:59"
  @minimumUpdatePeriod="PT5M"
  BaseURL="http://10.1.200.10/"
  Period
    @id=1
    @start= "2013-12-01T10:30:30 "
    AdaptationSet
      BaseURL="video1"
      SegmentTemplate
        @initialization="video/main/init.mp4v"
        @media="video/main/$Time$.mp4v"
        @timescale=90000
        SegmentTimeline
          S
            @t=0, @d=180000, @r=450
      Representation
        @id
    AdaptationSet
      BaseURL="audio"
        :
```

*FIG. 8*

- tfdt@BaseMediaDecodeTime: INDICATE FIRST DECODING TIME (ABSOLUTE VALUE) ON segment timeline.
- trun@sample: INDICATE NUMBER OF samples.
- trun@dataoffset: INDICATE HEAD OF SAMPLE.
- trun@sample_duration: INDICATE duration (time) OF sample.
- trun@sample_composition_time_offset: INDICATE OFFSET TIME FROM DECODING TIME TO DISPLAY TIME.

TRANSMISSION DEVICE, TRANSMITTING METHOD, RECEPTION DEVICE, AND RECEIVING METHOD

CROSS REFERENCE TO RELATED APPLICATIONS

This application is a U.S. National Phase of International Patent Application No. PCT/JP2015/050695 filed on Jan. 13, 2015, which claims priority benefit of Japanese Patent Application No. 2014-017164 filed in the Japan Patent Office on Jan. 31, 2014. Each of the above-referenced applications is hereby incorporated herein by reference in its entirety.

TECHNICAL FIELD

The present technology relates to a transmission device, a transmitting method, a reception device, and a receiving method, and more specifically relates to a transmission device and the like that performs transmission by carrying, on a broadcast signal, a transmission media packet obtained by fragmenting transmission media such as video and audio.

BACKGROUND ART

In the related art, digital broadcasting is globally regulated and applied based on system specifications of an MPEG2-TS format. As ten to fifteen years have passed from start of applying the digital broadcasting, high resolution and high image quality are increasingly demanded along with development of a video encoding technology. Furthermore, on the other hand, since popularization and speed-up of the Internet are achieved, a video signal having image quality equivalent to broadcasting can be received through a communication channel.

In the related art, proposed is Internet protocol television (IPTV) delivery system using a network such as the Internet (refer to Patent Document 1, for example). Recently, standardization is established in Internet streaming such as IPTV. For instance, a system applied in video on demand (VoD) streaming or live streaming by hypertext transfer protocol (HTTP) streaming is standardized.

Particularly, attention is paid to dynamic adaptive streaming over HTTP (DASH) standardized by ISO/IEC/MPEG. In the DASH, a client terminal acquires and reproduces streaming data based on a metafile called as media presentation description (MPD) and an address (url) of chunked media data described therein. The media data in this case is media data such as audio, video, and subtitle.

CITATION LIST

Patent Document

Patent Document 1: Japanese Patent Application Laid-Open No. 2011-193058

SUMMARY OF THE INVENTION

Problems to be Solved by the Invention

Under above-described situations, expectation in a service to utilize broadcasting and communication integrally is growing, and there is a technical demand to establish standardization and integration of delivery specifications between broadcasting and communication.

The present technology is directed to appropriately achieving clock synchronization and presentation synchronization in the case of performing transmission by carrying, on a broadcast signal, a transmission media packet obtained by fragmenting transmission media such as video and audio.

Solutions to Problems

A concept of the present technology is to provide a transmission device that includes:
a clock generation unit adapted to generate a clock of a first frequency synchronized with time information acquired from a time information server;
a time information generation unit adapted to generate time information synchronized with time information acquired from the time information server and including frequency information of the clock of the first frequency generated in the clock generation unit;
an encoding unit adapted to encode a transmission medium;
a packetizer adapted to fragment, in a predetermined unit, the transmission medium encoded in the encoding unit, and generate a transmission media packet including each fragment; and
a transmission unit adapted to perform transmission by carrying, on a broadcast wave, a stream that includes, on time division basis, the transmission media packet generated in the packetizer, a time information packet having the time information generated in the time information generation unit, and a control signal packet including a control signal.

In the present technology, the clock of the first frequency such as 27 MHz synchronized with the time information acquired from the time information server such as a network time protocol (NTP) server is generated by the clock generation unit. The time information including the frequency information of the clock of the first frequency generated in the clock generation unit is generated by the time information generation unit.

For example, the time information generation unit may include: a 9-bit counter to count the clock of 27 MHz generated in the clock generation unit and divide a frequency by 300; a 17-bit counter to count frequency-divided output from the 9-bit counter and divide a frequency by 90000; and a 32-bit counter to count frequency-divided output from the 17-bit counter.

The transmission media such as video and audio are encoded by the encoding unit. A transmission medium encoded in the encoding unit is fragmented in the predetermined unit by the packetizer, and the transmission media packet including each fragment is generated. For example, the packetizer may acquire period information to be inserted into the transmission media packet and used to calculate a decoding time and a presentation time per presentation unit of the transmission medium based on a clock of 90 KHz obtained in the time information generation unit.

Furthermore, for example, the transmission media packet generated in the packetizer may be a media segment including predetermined number of movie fragments, and the packetizer may acquire the period information to be inserted into a tfdt box and a trun box inside a moof box constituting the movie fragment.

The broadcast wave that carries the stream including, on time division basis, the transmission media packet generated in the packetizer, the time information packet having the time information generated in the time information generation unit, and the control signal packet including the control signal is transmitted by the transmission unit.

Thus, in the present technology, the stream carried on a broadcast wave includes the packet having the time information including the frequency information of the clock of the first frequency synchronized with the time information acquired from the time information server. Therefore, a receiving side can generate the clock of the first frequency (system clock) same as a transmitting side based on the time information, and clock synchronization can be achieved.

Furthermore, in the present technology, the period information to be inserted into the transmission media packet and used to calculate the decoding time and the presentation time per presentation unit of the transmission medium is acquired based on a clock of a second frequency such as 90 KHz obtained in the time information generation unit. Therefore, on the receiving side, presentation synchronization can be achieved based on: the time information including the frequency information of the clock of the first frequency generated based on the time information included in the stream; and the decoding time and the presentation time calculated by the period information inserted into the transmission media packet per presentation unit of the transmission medium.

Furthermore, another concept of the present technology is to provide a reception device that includes:

a receiving unit adapted to receive a broadcast wave carrying a stream that includes, on time division basis, a transmission media packet including a fragment obtained by fragmenting an encoded transmission medium, a time information packet including frequency information of a clock of a first frequency and having time information synchronized with time information acquired from a time information server, and a control signal packet having a control signal;

a clock generation unit adapted to generate a clock of the first frequency based on time information included in the time information packet;

a time information generation unit adapted to generate time information including frequency information of the clock of the first frequency generated in the clock generation unit and synchronized with time information acquired from the time information server;

a time calculator adapted to calculate a decoding time and a presentation time per presentation unit of the transmission medium based on period information inserted into the transmission media packet; and a processing unit adapted to process, per presentation unit, an encoded transmission medium included in the transmission media packet received in the receiving unit based on the decoding time and the presentation time calculated in the time calculator and the time information generated in the time information generation unit.

In the present technology, the broadcast wave carrying the stream is received in the receiving unit. The stream includes the transmission media packet, the time information packet, and the control signal packet on time division basis. Here, the transmission media packet has the fragment obtained by fragmenting the encoded transmission medium. The time information packet has the time information including the frequency information of the clock of the first frequency such as 27 MHz and synchronized with the time information acquired from the time information server such as an NTP server. Furthermore, the control signal packet has the control signal.

For example, the transmission media packet received in the receiving unit may be a media segment including predetermined number of movie fragments, and period information used to calculate a decoding time and a presentation time per presentation unit of the transmission medium may be inserted into a tfdt box and a trun box inside a moof box constituting the movie fragment.

The clock of the first frequency is generated by the clock generation unit based on the time information included in the time information packet. The time information including the frequency information of the clock of the first frequency and synchronized with the time information acquired from the time information server is generated by the time information generation unit.

Furthermore, the decoding time and the presentation time per presentation unit of the transmission medium are calculated by the time calculator based on the period information inserted into the transmission media packet. Furthermore, the encoded transmission medium included in the transmission media packet received in the receiving unit is processed, per presentation unit, by the processing unit based on the decoding time and the presentation time calculated in the time calculator and the time information generated in the time information generation unit.

Thus, in the present technology, the clock of the first frequency (system clock) same as the transmitting side and the time information including the frequency information of the clock of the first frequency are generated based on the time information associated with the time information included in the broadcast signal and acquired from the time information server. Furthermore, the decoding time and the presentation time per presentation unit of the transmission medium is calculated based on the period information inserted into the transmission media packet, and decoding and display processing are performed per presentation unit of the transmission medium. Therefore, clock synchronization and presentation synchronization can be achieved.

Additionally, in the present technology, for example, the time information generation unit may include a 9-bit counter to count the clock of 27 MHz generated in the clock generation unit and divide a frequency by 300, a 17-bit counter to count frequency-divided output from the 9-bit counter and divide a frequency by 90000, and a 32-bit counter to count frequency-divided output from the 17-bit counter, and may generate time information having a second section and a subsecond section indicated by a count value of a clock of 90 KHz. The time calculator may calculate each of the decoding time and the presentation time in a manner divided into the second section and the subsecond section indicated by the count value of the clock of 90 KHz. In this case, timing of decoding and displaying can be obtained by executing matching between the generated time information and calculated decoding time and presentation time by executing matching in the second section and the subsecond section respectively.

Effects of the Invention

According to the present technology, clock synchronization and presentation synchronization can be appropriately achieved in the case of performing transmission by carrying, on a broadcast signal, a transmission media packet obtained by fragmenting a transmission media such as video and audio. Note that effects are not limited to those recited herein but may be any one of those recited in the present disclosure.

BRIEF DESCRIPTION OF DRAWINGS

FIG. 5 is a diagram illustrating a structure of a media segment (MS) included in an f-MP4 format stream.

FIG. 6 is a diagram illustrating an exemplary description in an MPD file included in an f-MP4 format stream as a service channel signal (SCS).

FIG. 8 is a diagram illustrating content of main information included in a "tfdt" box and a "trun" box inside a "moof" box.

MODE FOR CARRYING OUT THE INVENTION

Modes to implement the technology (hereinafter referred to as "embodiment") will be described below. Note that description will be provided in the following order.
1. Embodiment
2. Modified Example
<1. Embodiment>
[Exemplary Configuration of Transmitting/Receiving System]

Figure 1:
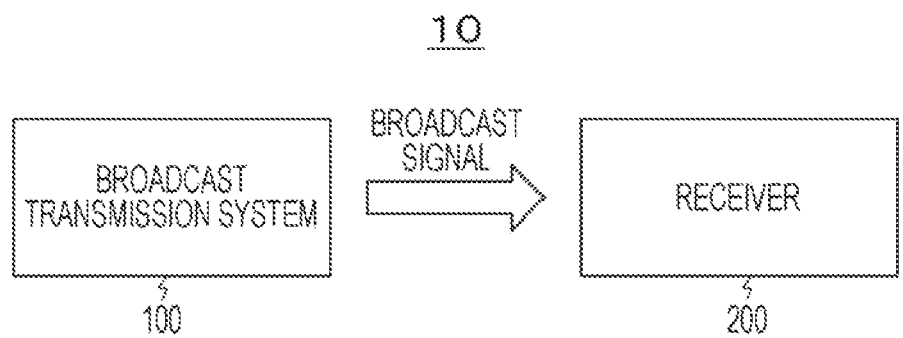
FIG. 1 is a block diagram illustrating an exemplary configuration of a transmitting/receiving system according to an embodiment.

FIG. 1 is a diagram illustrating an exemplary configuration of a transmitting/receiving system 10 as an embodiment. A transmitting/receiving system 10 is formed of a broadcast transmission system 100 and a receiver 200.

The broadcast transmission system 100 generates: a clock of 27 MHz (system clock) synchronized with time information acquired from a network time protocol (NTP) server provided as a time information server; and time information including frequency information of the clock of 27 MHz. The broadcast transmission system 100 fragments transmission media such as video and audio in a predetermined unit, and generates a transmission media packet (media segment) including each fragment.

The broadcast transmission system 100 inserts, into the transmission media packet, period information used to calculate a decoding time and a presentation time per presentation unit of a transmission medium, and acquires the period information based on a clock of 90 KHz used in generating the time. The broadcast transmission system 100 performs transmission by carrying, on broadcast wave, a fragmented MP4 (f-MP4) format stream that includes, on time division basis, a transmission media packet, a time information packet having time information, and a control signal packet having a control signal.

The receiver 200 receives the above-described broadcast wave transmitted from the broadcast transmission system 100. The receiver 200 generates, based on the time information included in the f-MP4 format stream transmitted by being carried on the broadcast, a clock of 27 MHz (system clock) synchronized with the time information and time information including the frequency information of the clock of 27 MHz and synchronized with the time information acquired from the time information server.

Furthermore, the receiver 200 calculates a decoding time and a presentation time per presentation unit of the transmission medium based on the period information inserted into the transmission media packet. Moreover, the receiver 200 processes, per presentation unit, the transmission medium included in the f-MP4 format stream based on the calculated decoding time and presentation time and the generated time information.

In the transmitting/receiving system 10, clock synchronization and presentation synchronization can be achieved by configuring the broadcast transmission system 100 and the receiver 200 as described above in the same manner as an MPEG2-TS format in the related art.

Figure 2:
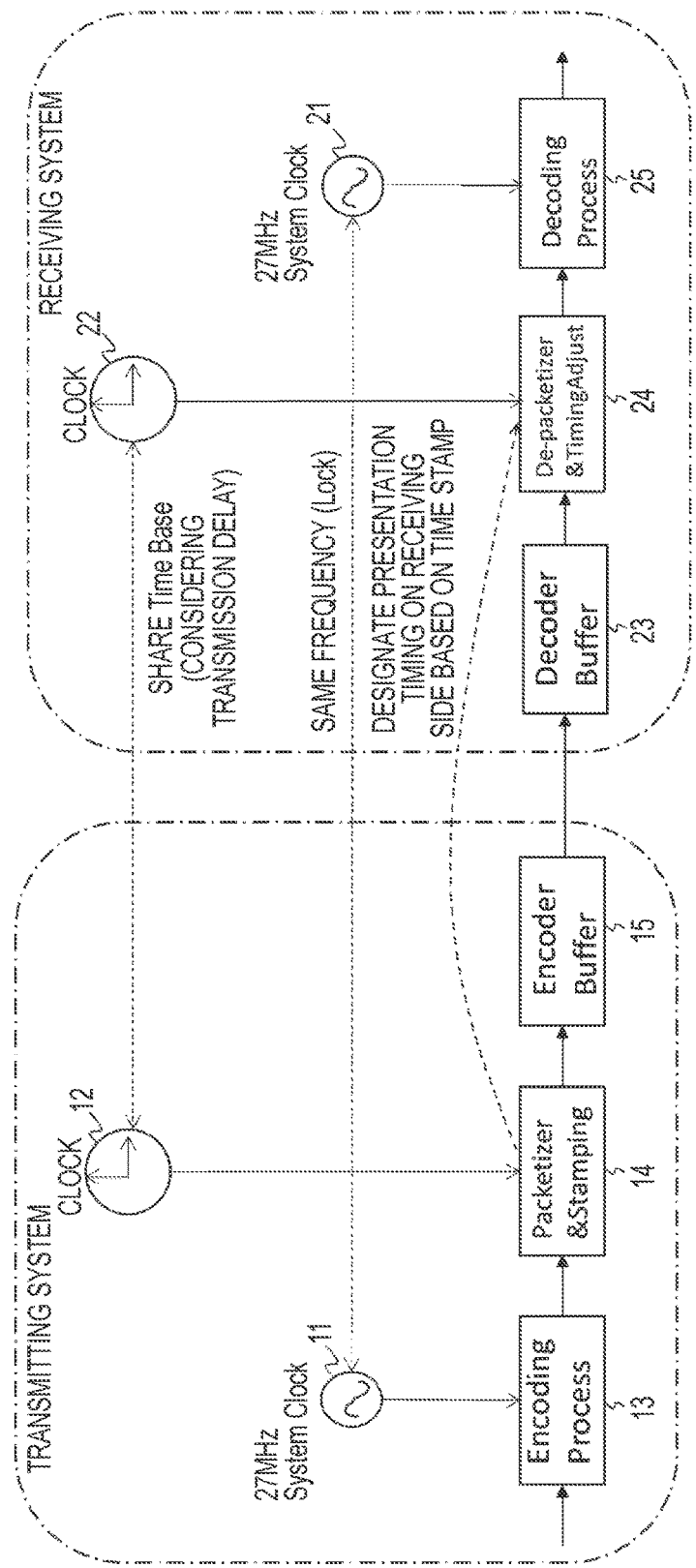
FIG. 2 is a diagram to describe clock synchronization and presentation synchronization in the transmitting/receiving system.

Clock synchronization and presentation synchronization in the transmitting/receiving system will be described using FIG. 2. A transmitting system and a receiving system correspond to, for example, the above-described broadcast transmission system 100 and the receiver 200. The transmitting system includes a clock generation unit 11 to generate a system clock of 27 MHz, and a clock unit (time information generation unit) 12 to generate time information. Furthermore, the transmitting system includes an encoding processing unit 13, a packetizing/time stamping unit 14, and an encoder buffer 15.

In the encoding processing unit 13, the transmission media such as video and audio are encoded. In the packetizing/time stamping unit 14, the encoded transmission medium is packetized, and also the presentation time (PTS: presentation time stamp) is added per presentation unit based on the time information generated in the clock unit 12. Furthermore, the packet of the transmission medium is temporarily accumulated in the encoder buffer 15 and transmitted at appropriate timing.

The receiving system includes: a clock generation unit 21 to generate a system clock of 27 MHz; and a clock unit (time information generation unit) 22 to generate time information. Furthermore, the receiving system includes a decoder buffer 23, a depacketizing/timing adjusting unit 24, and a decoding processing unit 25.

The decoder buffer 23 temporarily accumulates the received packet of the transmission medium. In the depacketizing/timing adjusting unit 24, the received packet of the transmission medium accumulated in the decoder buffer 23 is taken out and depacketized at the timing of the added presentation time information, referring to the time information generated in the clock unit 22. In the decoding processing unit 25, the transmission medium obtained after depacketization is decoded, and the transmission medium of a baseband is obtained.

Here, a meaning of clock synchronization is that a frequency of the system clock generated in the clock generation unit 11 of the transmitting system and a frequency of the system clock generated in the clock generation unit 21 of the receiving system become the same frequency. In the case where clock synchronization is not achieved, a failure such as frame skip may occur while the receiving side continues receiving operation.

Additionally, a meaning of presentation synchronization is that the time information of the clock unit 12 in the transmitting system is adjusted to be same as the time information of the clock unit 22 in the receiving system, and furthermore, the presentation time information per presentation unit of the transmission medium is added to the packet of the transmission medium. Meanwhile, here, in the case of adjusting the time information of the clock unit 22 in the receiving system to be same as the time information of the clock unit 12 in the transmitting system, transmission delay from the transmitting system to the receiving system is considered. In the case where presentation synchronization is not achieved, it may be impossible for the receiving side to perform synchronization of the video and audio and appropriately perform presentation without causing buffer failure.

Figure 3:
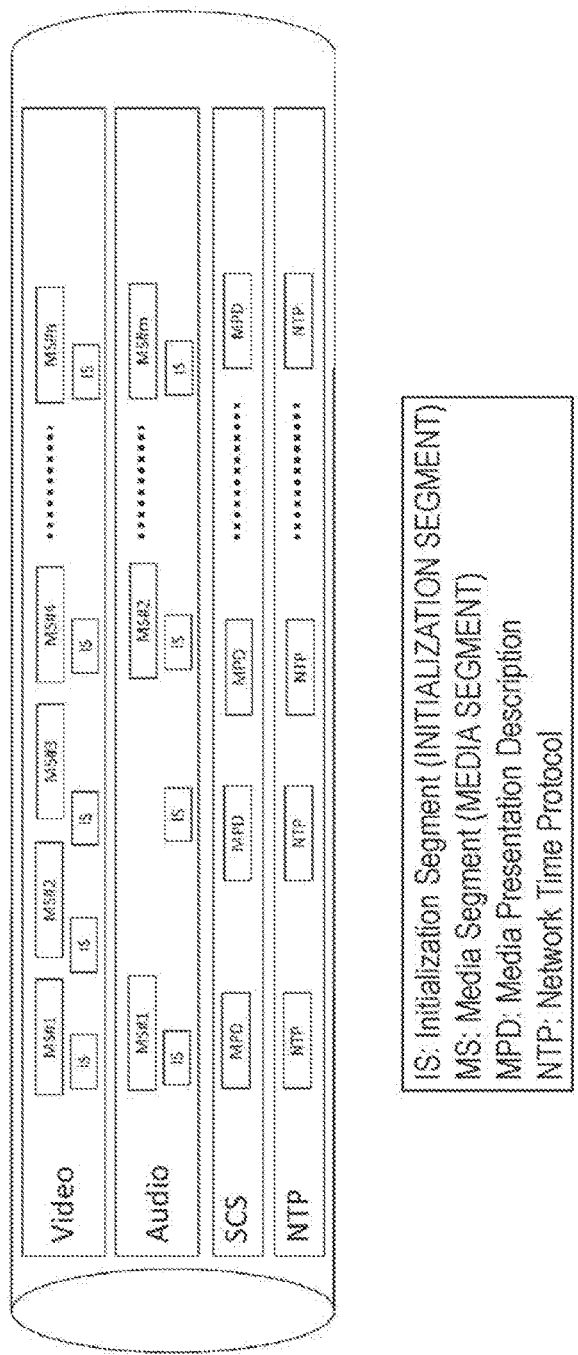
FIG. 3 is a diagram illustrating a structure of an f-MP4 stream format included in a broadcast signal transmitted to a receiver from a broadcast transmission system.

FIG. 3 is a diagram illustrating a structure of an f-MP4 format stream included in a broadcast signal transmitted to the receiver 200 from the broadcast transmission system 100. In this f-MP4 format stream, there are a media segment (MS) and an initialization segment (IS) as the transmission media packets described above associated with each of components of video and audio. The initialization segment (IS) includes initialization information of decoding processing and the like. At the time of receiving, the initialization segment (IS) is obtained and then media segment (MS) is received.

Furthermore, in this f-MP4 format stream, there is a service channel signal (SCS), namely, a packet including a control signal (control signal packet). In the drawing, only a packet including a metafile called as media presentation description (MPD) is illustrated. In the MPD file, information such as a compression system of a moving image, an encoding rate, an image size, and a language is hierarchically described in an XML format.

Furthermore, in this f-MP4 format stream, there is a packet synchronized with the time information acquired from the network time protocol (NTP) server and having the time information including the frequency information of the clock of 27 MHz (time information packet).

Figure 4:
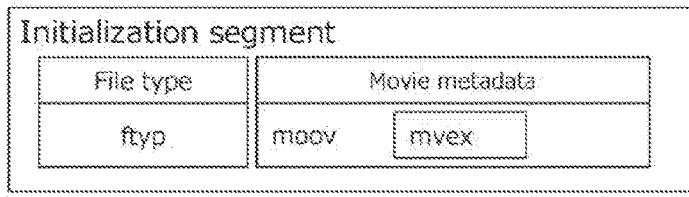
FIG. 4 is a diagram illustrating a structure of an initialization segment (IS) included in an f-MP4 format stream.

FIG. 4 is a diagram illustrating a structure of the initialization segment (IS). The initialization segment (IS) has a box structure based on an ISO base media file format (ISOBMFF). At the head, a "ftyp" box indicating a file type is arranged, and subsequently a "moov" "box" for control is arranged. Although a detailed description will be omitted, various kinds of boxes including a "mvex" box illustrated are included inside the "moov" box. This "moov" box includes initialization information of decoding processing, and the like.

FIG. 5 is a diagram illustrating a structure of the media segment (MS). The media segment (MS) has a box structure based on the ISO base media file format (ISOBMFF). At the head, a "styp" box indicating a segment type is arranged, and next a "sidx" box indicating a segment index is arranged, and subsequently one or plural movie fragments (Movie Fragments) are arranged.

The segment type information included in the "styp" box is a fixed value 'cmsdh'. The "styp" box may be omitted as well. Furthermore, the segment index information included in the "sidx" box is information indicating a byte value at the head of each of the movie fragments. In the case of one movie fragment, the "styp" box may be omitted as well.

Since a size of the movie fragment is a variable length, in the case of plural movie fragments, the "sidx" box is needed in order to find a byte value at the head of each of the movie fragments.

The movie fragment (Movie Fragment) is formed of a "moof" box to include control information and a "mdat" box to include an entity of a signal of video, audio, or the like (transmission media). In the "mdat" box of one movie fragment, a fragment obtained by fragmenting a transmission medium is included. Therefore, control information to be included in the "moof" box is the control information related to the fragment. A size of the fragment is assumed to be a group of picture (GOP) of MPEG Video, for example.

FIG. 6 is a diagram illustrating an exemplary MPD file. Note that this example is not actual XML description, and is made by arranging each of elements and attributes to be described in accordance a structure. In the MPD file, as described above, the information such as a compression system of a moving image, an encoding rate, an image size, and a language is hierarchically described in an XML format. In the MPD file, structs such as Period, AdaptationSet, Representation, and SegmentTemplate are hierarchically included. Specifications of description of the MPD file are defined by International Standards "ISO/IEC 23009-1" stipulating the specifications of MPEG-DASH.

The struct of Period has information of program (a pair of moving images and sounds synchronized). Further, the struct of AdaptationSet included in the struct of Period makes a group of stream selection range (a group of Representation). Further, the struct of Representation included in the struct of AdaptationSet has information such as an encoding rate of the moving image and sound, and a sound size of the moving image.

Furthermore, the struct of SegmentTemplate included in the struct of AdaptationSet has information associated with a segment of the moving image or sound. The struct of SegmentTemplate includes an initialization element indicating location information adapted to obtain the initialization segment (IS), a media attribute indicating a template of location information adapted to obtain the media segment (MS) and supplied in different files moment by moment, and so on.

In the MPD file, control information per Period is described. This Period indicates a period corresponding to one program, for example. In the MPD file, start time information of Period is included as "Period@start". The information is indicated by year, month, day, hour, minute, and second. In the example illustrated, "Period@start="2013-12-01T10:30:30"" is described, indicating ten thirty and thirty seconds on Dec. 1, 2013.

Furthermore, in the MPD file, time unit information at the time of designating a time such as presentation timing is included as "SegmentBase@timescale". In the example illustrated, "SegmentBase@timescale=90000" is described, indicating a unit of 1/90000 seconds (corresponding to a cycle of the clock of 90 KHz).

Furthermore, in the MPD file, period information indicating a start time of SegmentTimeline continuing from the media segment (MS) included in Period is included as "SegmentTimeline S@t". At this point, the period information indicates a relative time length from a start time of Period to a start time of SegmentTimeline, and is indicated by a count value of a clock having a frequency indicated by "SegmentBase@timescale". In the example illustrated, "SegmentTimeline S@t=0" is described, indicating that a start period of SegmentTimeline is the same as a start period of Period.

Furthermore, in the MPD file, period information indicating a time length of the media segment (MS) included in Period is included as "SegmentTimeline S@d". At this point, the period information is indicated by a count value of a clock having a frequency indicated by "SegmentBase@timescale". In the example illustrated, "SegmentTimeline S@t=180000" is described, indicating 2 seconds in the case of "SegmentBase@timescale=90000".

Figure 7:
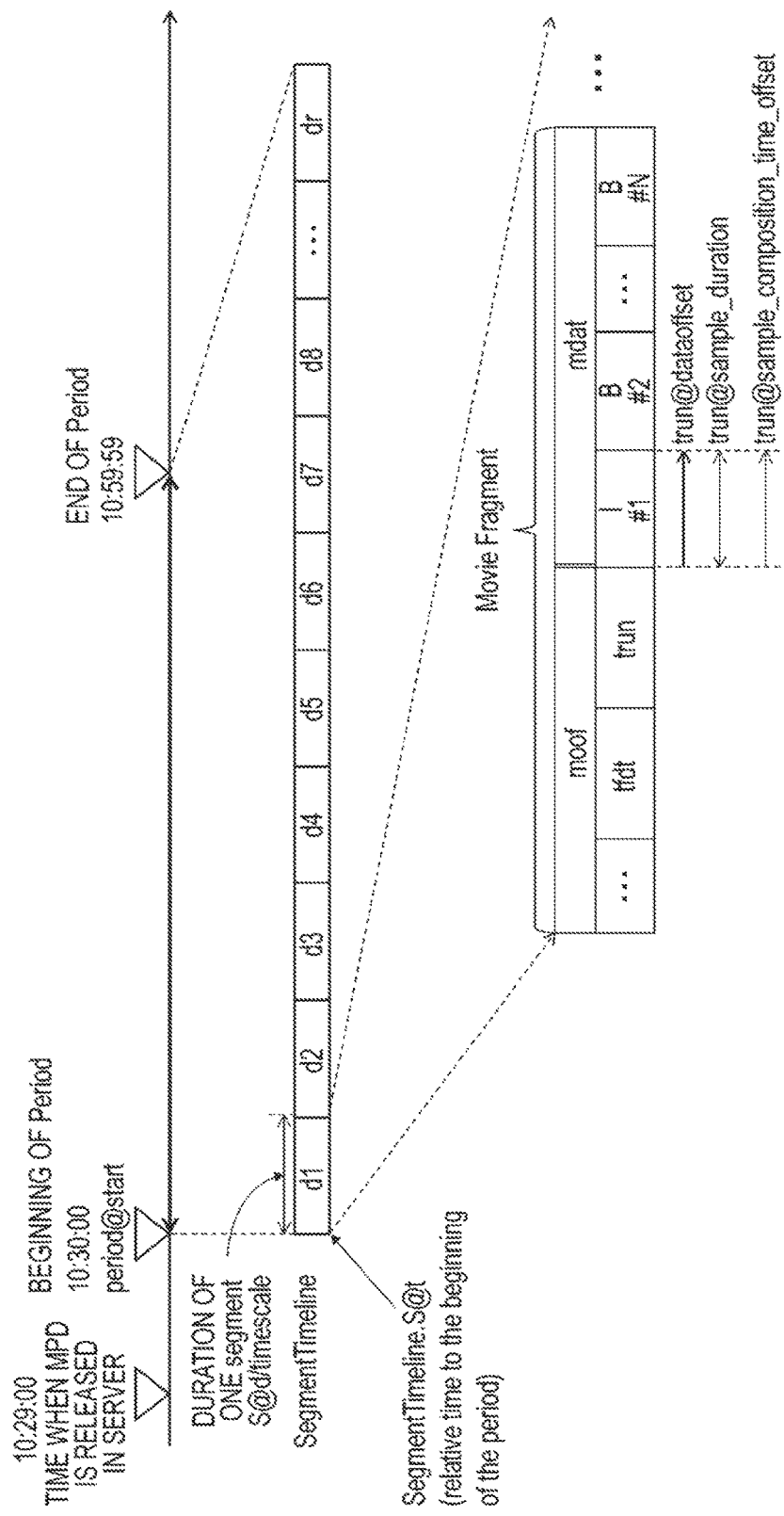
FIG. 7 is a diagram illustrating a time relation between Period and SegmentTimeline.

FIG. 7 is a diagram illustrating a time relation between Period and SegmentTimeline. In the example illustrated, "SegmentTimeline S@t=0" is described, indicating an example in which the start period of SegmentTimeline is the same as the start period of Period. In SegmentTimeline, d1, d2, . . . , dr indicate respective media segments (MS).

As described above, one or plural movie fragments (Movie Fragments) are arranged in the media segment (MS), and each movie fragment is formed of the "moof" box and the "mdat" box. In the "mdat" box, a fragment obtained by fragmenting the transmission medium is included. For example, in the case where the transmission medium is, for example, a video signal, encoding data of MPEG Video is included in the "mdat" box. As illustrated, the encoding data is formed of encoding data of a plurality of pictures such as an I picture and a B picture.

Furthermore, the "tfdt" box is included in the "moof" box. In the "tfdt" box, information of "base Media Decode Time" is included. As illustrated in FIG. 8, "base Media Decode Time" indicates a first decoding time of the movie fragment on SegmentTimeline (time of a time scale unit on SegmentTimeline). In the example illustrated, the decoding time of the I picture (picture #1) is shown.

Furthermore, a "trun" box is included in the "moof" box. The "trun" box includes information such as "trun@sample", "trun@dataoffset", "trun@sample_duration", and "trun@sample_composition_time_offset". As illustrated in FIG. 8, "trun@sample" indicates the number of samples, and the "trun" box includes, per sample, the respective information of "trun@dataoffset", "trun@sample_duration", and "trun@sample_composition_time_offset".

As illustrated in FIG. 8, "trun@dataoffset" indicates a head (byte position) of each sample, "trun@sample_duration" indicates a time width (duration) of each sample, and "trun@sample_composition_time_offset" indicates an offset time from a decoding time to a presentation time. Here, the sample corresponds to each picture of the MPEG Video.

On a receiving side, a decoding time and a presentation time can be calculated per presentation unit based on the information of "Period@start", "SegmentBase@timescale", and "SegmentTimeline S@t" included in the MPD file, and the information of "base Media Decode Time", "trun@sample_duration", and "trun@sample_composition_time_offset" included in each movie fragment (Movie Fragment).

Figure 9:
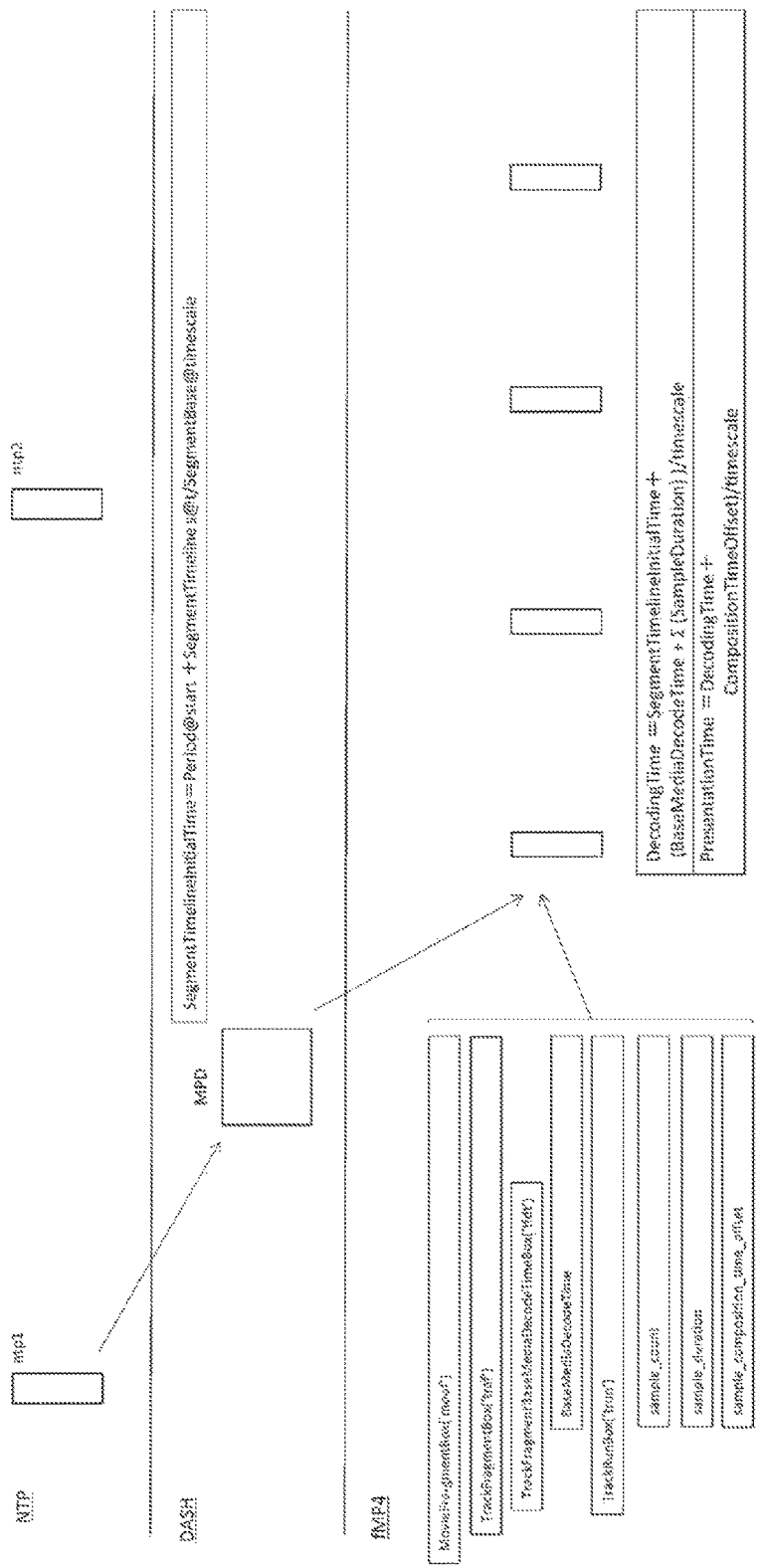
FIG. 9 is a diagram to describe mathematical formulae to calculate a decoding time and a presentation time for each presentation unit.

In other words, as illustrated in FIG. 9, "Segment Timeline Initial Time" corresponding to the start time of SegmentTimeline is obtained at first by a formula (1) below.

$$\text{SegmentTimelineInitialTime} = \text{Period@start} + \text{SegmentTimeline } s@t/\text{SegmentBase@timescale} \quad (1)$$

Furthermore, as illustrated in FIG. 9, the decoding time can be calculated by a formula (2) below.

$$\text{DecodingTime} = \text{SegmentTimelineInitialTime} + (\text{BaseMediaDecodeTime} + \Sigma(\text{SampleDuration}))/\text{timescaletm} \quad (2)$$

Furthermore, as illustrated in FIG. 9, the presentation time (Presentation Time) is obtained by a formula (3) below.

$$\text{PresentationTime} = \text{DecodingTime} + \text{CompositionTimeOffset}/\text{timescale} \quad (3)$$

Figure 10:
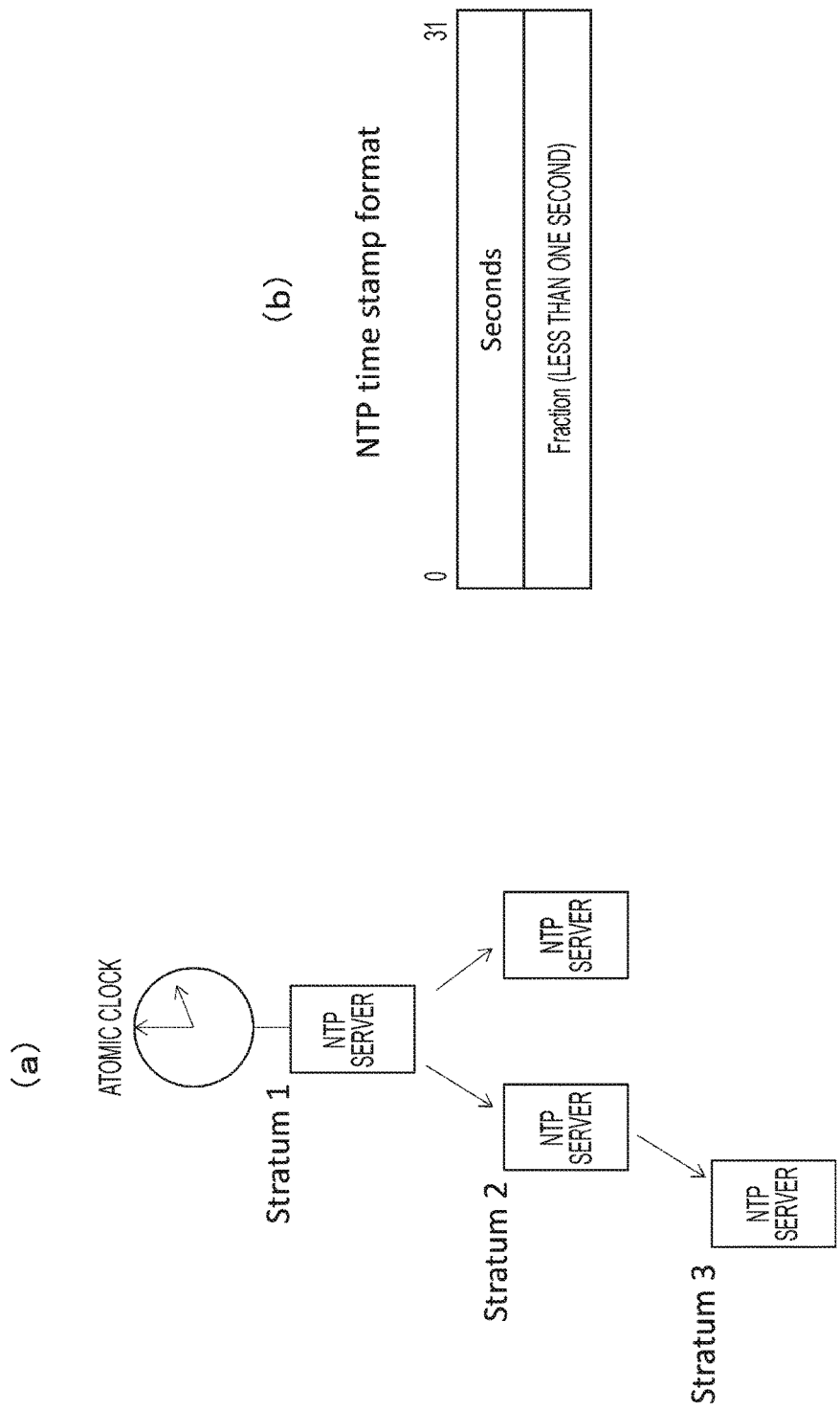
FIGS. 10(a) and 10(b) are diagrams to describe an NTP server and a time information format (NTP time stamp format) provided by the NTP server.

Now, network time protocol (NTP) will be described. As illustrated in FIG. 10(a), an NTP server includes strata, and the smaller the stratum number is, the higher the accuracy is. For example, the NTP server of a stratum 1 is directly connected to an atomic clock, and an error of time information is less than 1 μs. The time information provided by the NTP server is indicated by an integrated number of seconds from Jan. 1, 1900 (UTC: Coordinated Universal Time).

FIG. 10(b) is a diagram illustrating a format of the time information provided by the NTP server (NTP time stamp format). This time information has a 64-bit format, and high 32 bits indicate the integrated number of seconds of UTC, and low 32 bits indicate less than one second.

When the time information is acquired by accessing the NTP server by NTP protocol from a client such as a personal computer or a smartphone, it is unknown to which stratum of the NTP server is to be succeeded. Therefore, dispersion is suppressed by taking an average value by simultaneously accessing a plurality of NTP servers such that more correct time information can be acquired.

[Configuration of Broadcast Transmission System]

Figure 11:
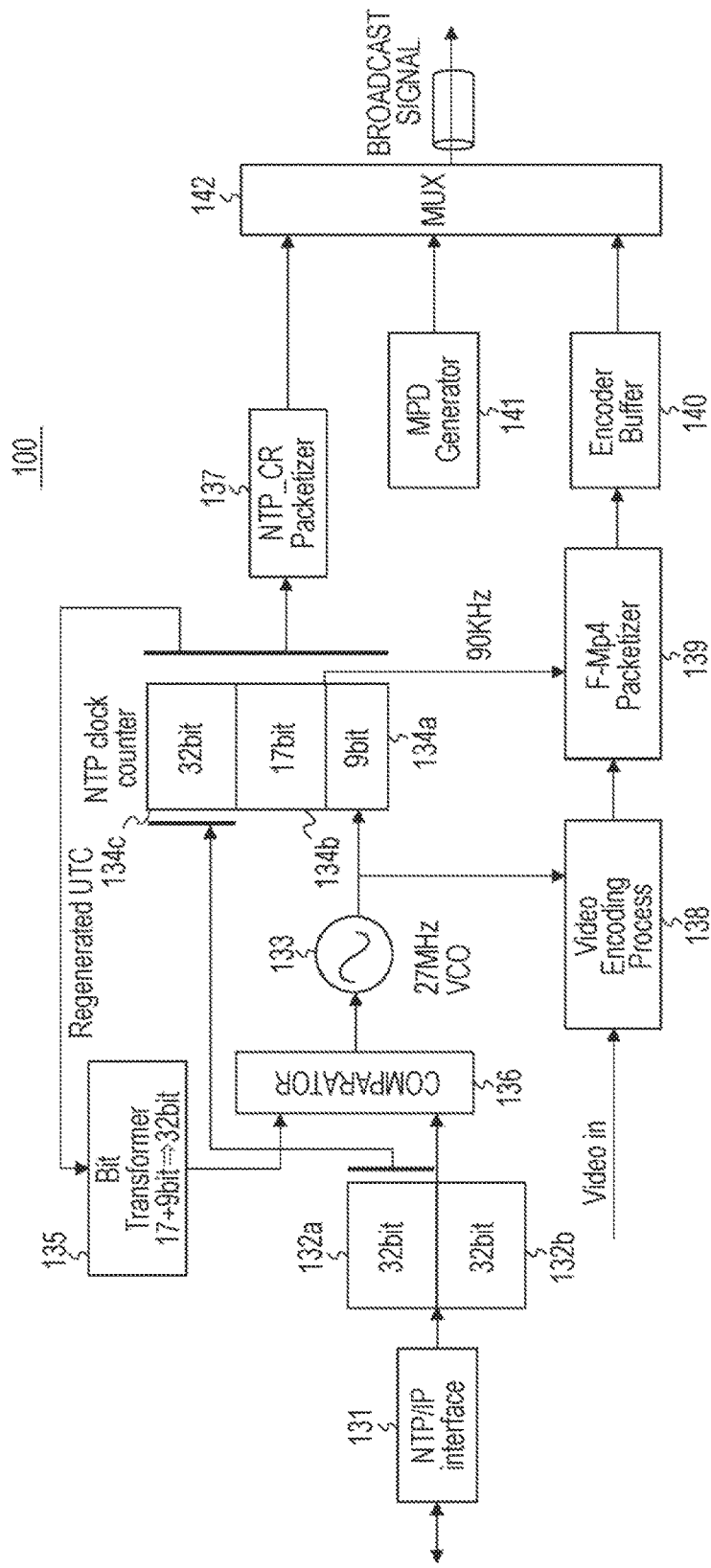
FIG. 11 is a block diagram illustrating an exemplary configuration of the broadcast transmission system.

FIG. 11 is a diagram illustrating an exemplary configuration of the broadcast transmission system 100. Note that an audio transmission system is omitted in the example illustrated. The broadcast transmission system 100 includes an NTP/IP interface 131 and 32-bit registers 132a, 132b. Furthermore, the broadcast transmission system 100 includes: a voltage controlled oscillator 133 to generate a clock of 27 MHz (system clock); a 9-bit counter 134a; a 17-bit counter 134b; a 32-bit counter 134c constituting the clock unit; a bit transform unit 135; and comparator 136. Moreover, the broadcast transmission system 100 includes an NTP-CR packetizer 137, a video encoding processing unit 138, an f-MP4 packetizer 139, an encoder buffer 140, an MPD generator 141, and a multiplexer 142.

Access is made by the NTP/IP interface 131 to the NTP server not illustrated via the Internet at a predetermined time interval, and time information in a 64-bit format is acquired (refer to FIG. 10(b)). In the 32-bit registers 132a, 132b, time information in a 64-bit format acquired by the NTP/IP interface 131 is held. In the 32-bit register 132a, bit data of the high 32 bits is held, and in the 32-bit register 132b, bit data of the low 32 bits is held. The content kept in the 32-bit registers 132a, 132b are updated every time the time information in the 64-bit format is acquired by the NTP/IP interface 131.

In the case where the time information is acquired frequently enough, this configuration may be applicable as it is, but in the case where the frequency is not sufficient, it may be considered to continuously operate the registers 132a, 132b as counters to automatically indicate the time so as to reproduce a clock of the NTP server. Here, when output of the register 132b indicating the low 32 bits of the acquired time information becomes all zero, output of the register 132a indicating the high 32 bits of the time information can be set as an initial value of the 32-bit counter 134c, and also the 17-bit counter 134b and the 9-bit counter 134a are set to all zero respectively. This setting operation can be limited to only once when operation of the broadcast transmission system 100 is started.

In the voltage controlled oscillator 133, a clock of 27 MHz (system clock) is generated. In the 9-bit counter 134a, the clock of 27 MHz output from the voltage controlled oscillator 133 is counted, a frequency is divided by 300, and a clock of 90 KHz is output. In the 17-bit counter 134b, the clock of 90 KHz output from the 9-bit counter 134a is counted, a frequency is divided by 90000, and a clock of 1 Hz is output. In the 32-bit counter 134c, the clock of 1 Hz output from the 17-bit counter 134b *is counted, and bit output of* 32 bits, namely, time information of second precision (Regenerated UTC) is obtained.

The bit output of 58 bits from the 9-bit counter 134a, 17-bit counter 134b, and 32-bit counter 134c becomes a system time clock (STC) as the time information by counter operation from the initial value. The system time clock is received in the bit transform unit 135.

In the bit transform unit 135, bit output from the 9-bit counter 134a *and the* 17-bit counter 134b is transformed to 32-bit output continuing to a low order of the bit output from 32-bit counter 134c by using, for example, a transform table. This transform is performed in order to conform to the bit output of low 32 bits of the time information in the 64-bit format acquired from the NTP server. In the bit transform unit 135, 64-bit output obtained by combining 32-bit output thus transformed with the bit output from the 32-bit counter 134c can be obtained.

In the comparator 136, the bit output of 64 bits from the bit transform unit 135 is latched at the timing of updating the content held in the 32-bit registers 132a, 132b, and then compared with the content held in the registers, namely, the time information in the 64-bit format acquired from the NTP server. Further, a comparison error signal is supplied from the comparator 136 to the voltage controlled oscillator 133 as a control signal.

Here, a phase locked loop (PLL) circuit is formed of the voltage controlled oscillator 133, counters 134a, 134b, 134c, bit transform unit 134, and comparator 136. Therefore, in the voltage controlled oscillator 133 a clock of 27 MHz (system clock) synchronized with the time information in the 64-bit format acquired from the NTP server is generated. Furthermore, in the counters 134a, 134b, 134c, 58-bit time information including frequency information of the clock of 27 MHz and synchronized with the time information in the 64-bit format acquired from the NTP server is generated.

Figure 12:
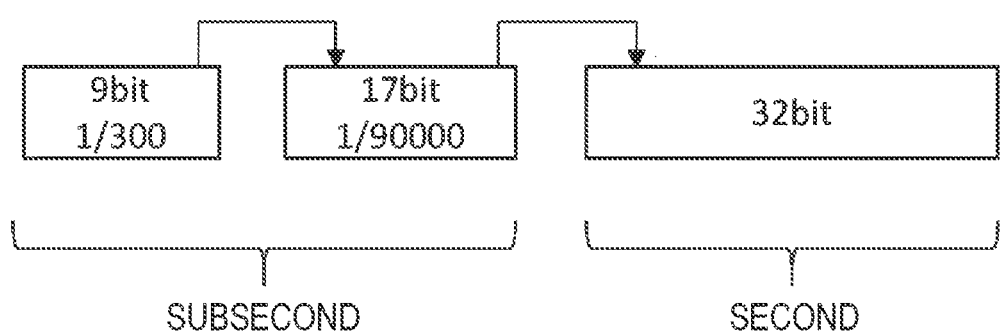
FIG. 12 is a diagram illustrating a configuration of an NTP clock reference.

This 58-bit time information is supplied to the NTP-CR packetizer 137. In the NTP-CR packetizer 137, a packet including NTP clock reference (NTP_CR: NTP Clock Reference) having the frequency information of the clock of 27 MHz is generated based on the 58-bit time information. FIG. 12(a) is a diagram illustrating a configuration of this NTP clock reference. The packet thus generated in the packetizer 137 and including NTP_CR is supplied to the multiplexer 142.

In the video encoding processing unit 138, encoding is applied to video data to be transmitted in synchronization with the clock of 27 MHz obtained in the voltage controlled oscillator 133, and a video elementary stream is obtained. In the f-MP4 packetizer 139, the video elementary stream thus obtained is fragmented every predetermined time such as per 10 seconds, and a media segments (MS) including each fragment is generated. Additionally, in the f-MP4 packetizer 139, an initialization segment (IS) is also generated. The media segment (MS) and initialization segment (IS) thus generated in the f-MP4 packetizer 139 are supplied to the multiplexer 142 via the encoder buffer 140.

Further, the f-MP4 packetizer 139 acquires period information used to calculate a decoding time and a presentation time per presentation unit of a video signal as a transmission medium based on the clock of 90 KHz output from the 9-bit counter 134a constituting the clock unit. The period information referred here corresponds to: "base Media Decode Time" to be inserted into the "tfdt" box inside the "moof" box constituting each movie fragment (Movie Fragment); and "trun@sample_duration" of each sample to be inserted into the "trun" box inside the "moof" box.

Figure 13:
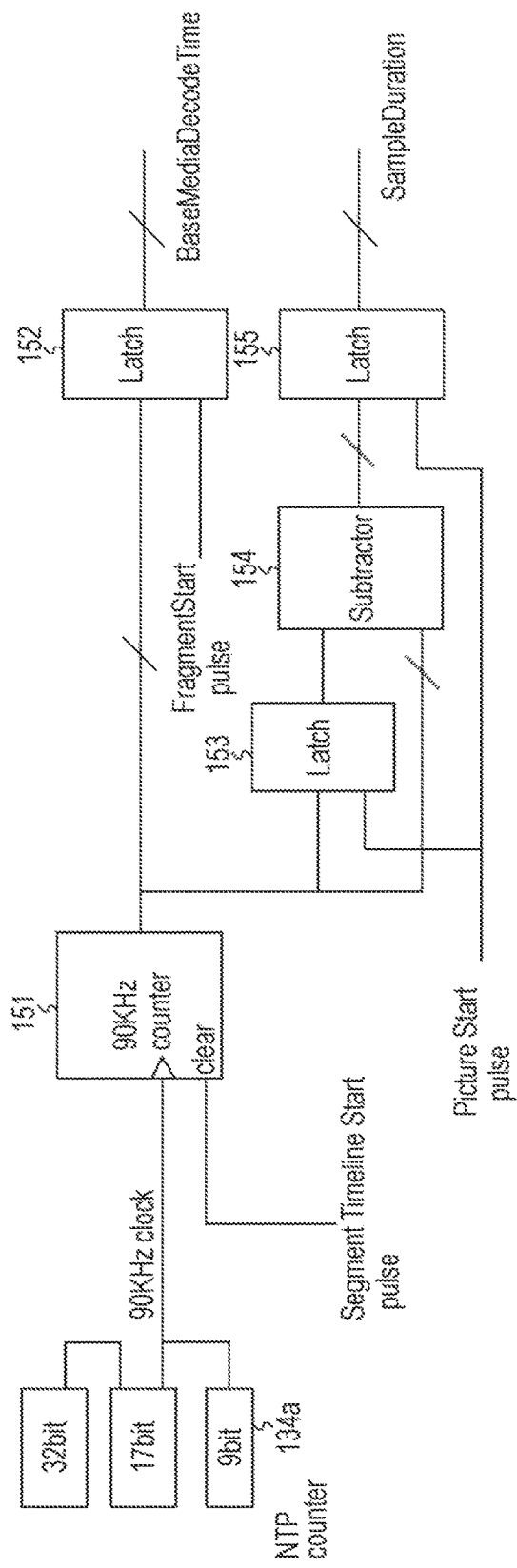
FIG. 13 is a block diagram illustrating an exemplary configuration of a period information acquisition unit.

FIG. 13 is a block diagram illustrating an exemplary configuration of a period information acquisition unit 150 inside the f-MP4 packetizer 139. The period information acquisition unit 150 includes a 90 KHz counter 151, latch circuits 152, 153, 155, and a subtractor 154. The clock of 90 KHz output from the 9-bit counter 134a (refer to FIG. 14(a)) is supplied to the 90 KHz counter 151 as a counter clock.

Figure 14:
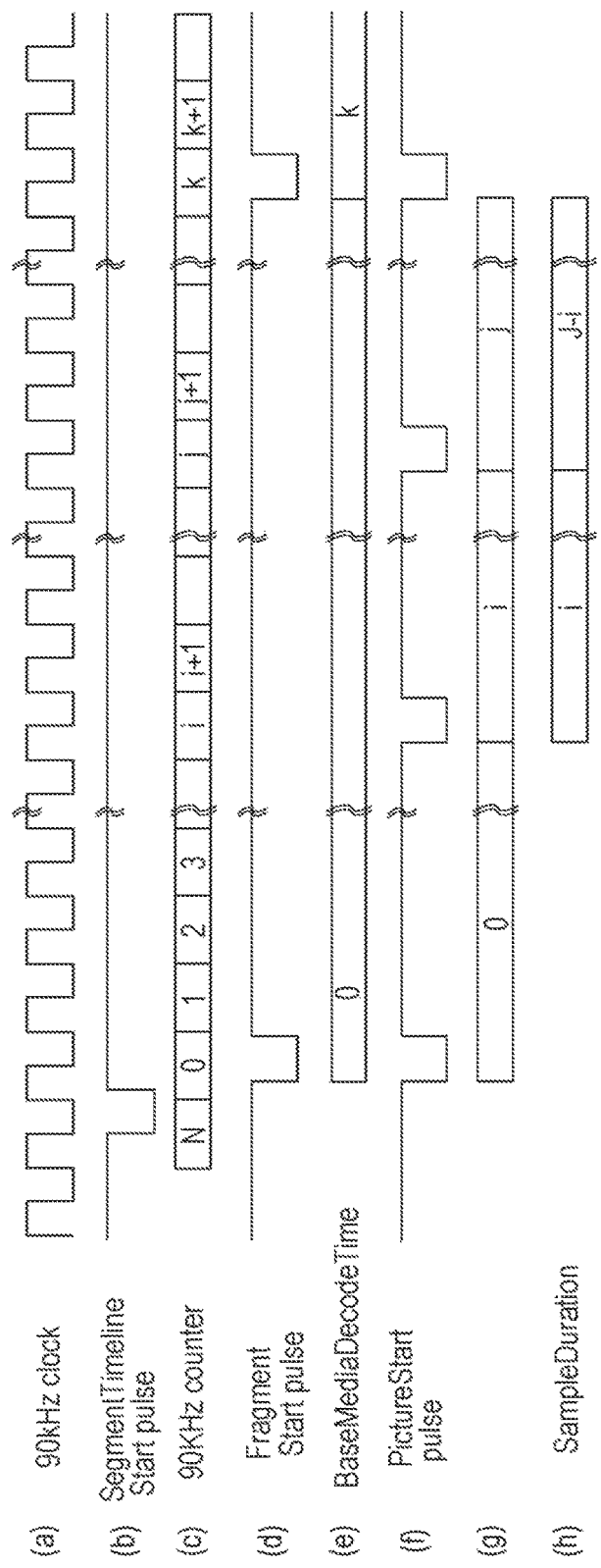
FIG. 14 is a diagram illustrating a signal state in each of units of the period information acquisition unit.

Furthermore, in the 90 KHz counter 151, a segment timeline start pulse (refer to FIG. 14(b)) generated at the timing of start time of SegmentTimeline is supplied as a clear signal from the video encoding processing unit 138. Consequently, a count value at the 90 KHz counter 151 is cleared to zero at the timing of start time of SegmentTimeline, and then counted up in synchronization with the clock of 90 KHz (refer to FIG. 14(c)).

The count value at the 90 KHz counter 151 is received in the latch circuit 152. Furthermore, in the latch circuit 152, a fragment start pulse (refer to FIG. 14(d)) generated at the timing of decoding time of a first picture of a GOP included in the "mdat" box of each movie fragment (Movie Fragment) is supplied as a latch pulse from the video encoding processing unit 138. Consequently, information of "base Media Decode Time" to be inserted into the "tfdt" box inside the "mdat" box of each movie fragment (Movie Fragment), namely, a count value (refer to FIG. 14(e) corresponding to a time length from the start time of SegmentTimeline to the decoding time of the first picture of the GOP can be sequentially obtained as output of the latch circuit 152.

The count value at the 90 KHz counter 151 is received in the latch circuit 153. Furthermore, in the latch circuit 153, a picture start pulse (refer to FIG. 14(f)) generated at the timing of decoding time of each picture of the GOP included in the "mdat" box of each movie fragment (Movie Fragment) is supplied as a latch pulse from the video encoding processing unit 138. Consequently, a count value (refer to FIG. 14(g)) corresponding to a time length from the start time of SegmentTimeline to the decoding time of each picture of the GOP of each movie fragment can be sequentially obtained as output of the latch circuit 153.

Output of the latch circuit 153 is supplied to the subtractor 154 as input on a side. Furthermore, the count value of the 90 KHz counter 151 is supplied to the subtractor 154 as input on the other side. Moreover, a difference value obtained by subtracting the output of the latch circuit 153 from the count value of the 90 KHz counter 151 is obtained as output of the subtractor 254.

Output of the subtractor 154 is received in the latch circuit 155. Furthermore, in the latch circuit 155, a picture start pulse (refer to FIG. 14(f)) generated at the timing of the decoding time of each picture of the GOP included in the "mdat" box of each movie fragment (Movie Fragment) is supplied as a latch pulse from the video encoding processing unit 138. Consequently, information of "Sample Duration" to be inserted into the "trun" box inside the "mdat" box of each movie fragment (Movie Fragment), namely, a count value (refer to FIG. 14(h)) corresponding to a time width (duration) of each picture (each sample) of the GOP can be sequentially obtained as output of the latch circuit 155.

Back to FIG. 11, the MPD generator 141 generates an MPD file (refer to FIG. 6) and generates a packet including the MPD file. The packet is supplied to the multiplexer 142. The multiplexer 142 generates an f-MP4 format stream including each packet. The f-MP4 format stream is transmitted by being carried on a broadcast wave.

Meanwhile, it may also be assumed that the broadcast transmission system is formed as an assembled body of independent devices having modes of synchronization signal generators 131 to 137, encoders 138 to 140, and a multiplexer 142. In this case, instead of directly connecting the clock of 27 MHz as an interface of the encoder from the synchronization signal generator, there may be a method of generating only a clock of 90 KHz or a so-called TV synchronization signal (horizontal/vertical synchronization signal) in the synchronization signal generator, and supplying the same to the encoder, and then causing the TV synchronization signal to lock a voltage-controlled oscillator of 27 MHz in the encoder as well.

[Configuration of Receiver]

Figure 15:
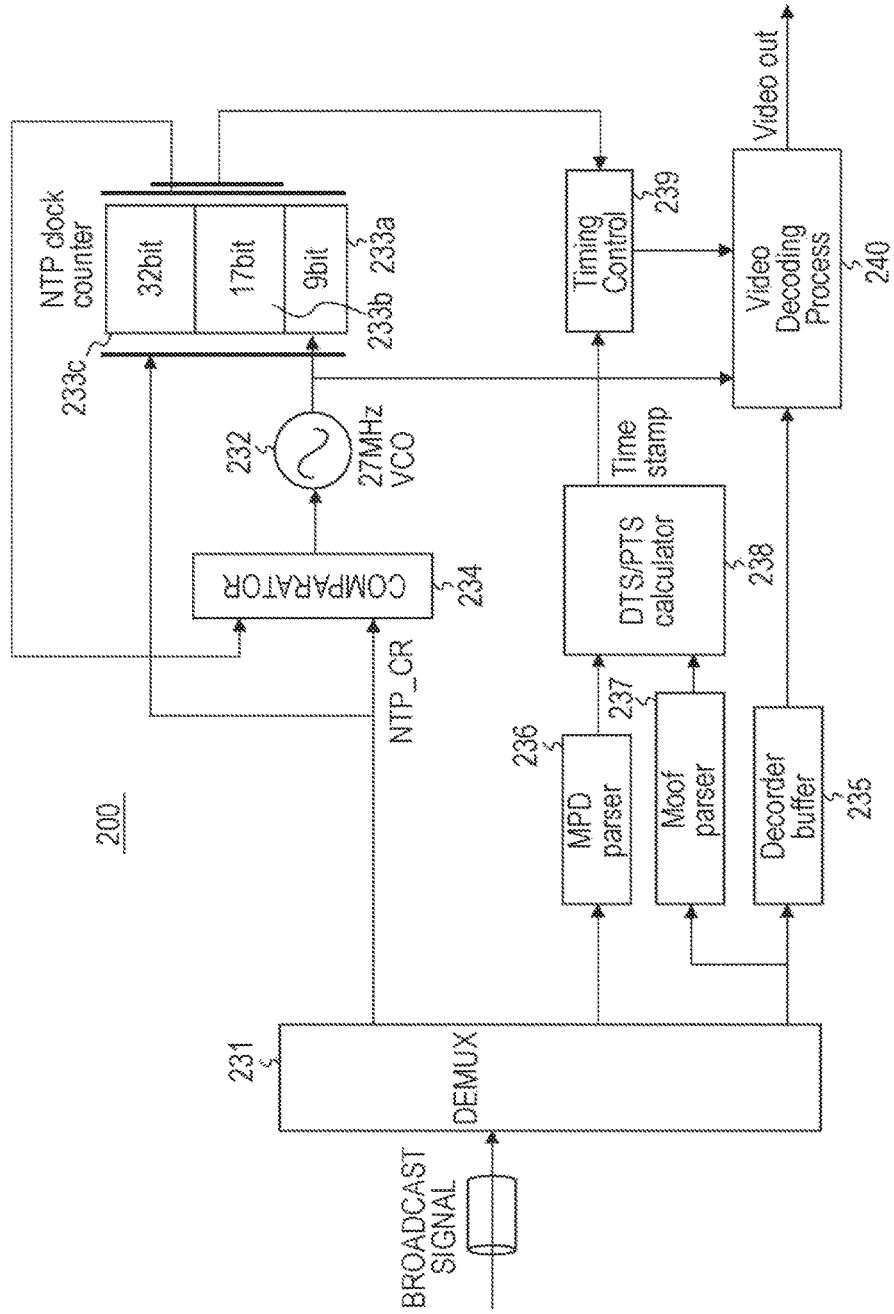
FIG. 15 is a block diagram illustrating an exemplary configuration of a receiver.

FIG. 15 is a diagram illustrating an exemplary configuration of the receiver 200. Note that an audio receiving system is omitted in the example illustrated. The receiver 200 includes: a demultiplexer 231; a voltage controlled oscillator 232 to generate a clock of 27 MHz (system clock); a 9-bit counter 233a; a 17-bit counter 233b; a 32-bit counter 233c constituting a clock unit; and a comparator 234. Furthermore, the receiver 200 includes a decoder buffer 235, an MPD parser 236, a Moof parser 237, a DTS/PTS calculator 238, a timing controller 239, and a video decoding processing unit 240.

In the demultiplexer 231, the f-MP4 format stream transmitted by being carried on a broadcast wave is supplied. In the demultiplexer 231, the NTP clock reference (NTP_CR) is extracted from the packet including NTP_CR. When a channel is selected or when power is turned on, 58-bit NTP_CR initially received initially is set as an initial value at a 58-bit counter including the counter 233a, counter 233b, and counter 233c, and then the received NTP_CR is supplied to the comparator 234.

Further, a clock of 27 MHz generated in the voltage controlled oscillator 232 is counted in the 9-bit counter 233a and a frequency is divided by 300. A clock of 90 KHz obtained in the 9-bit counter 233a is counted in the 17-bit counter 233b, and a frequency is divided by 90000. Furthermore, a clock of 1 Hz obtained in the 17-bit counter 233b is counted in the 32-bit counter 233c. In the 32-bit counter 233c, bit output of 32 bits corresponding to the time information of second precision (Regenerated UTC) is obtained.

Bit output of 58 bits from the 9-bit counter 233a, 17-bit counter 233b, and 32-bit counter 233c is to be a system time clock (STC) as the time information. The system time clock is supplied to the comparator 234. In the comparator 234, for example, the system time clock is latched at the timing when NTP_CR is supplied from the demultiplexer 231, and then compared with NTP_CR.

A comparison error signal output from the comparator 234 is supplied to the voltage controlled oscillator 232 as a control signal. Here, a phase locked loop (PLL) circuit is formed of the voltage controlled oscillator 232, counters 233a, 233b, 233c, and comparator 234. Therefore, in the voltage controlled oscillator 232, a clock of 27 MHz synchronized with NTP_CR is generated. A frequency of the clock of 27 MHz is equal to a frequency of the clock generated in the voltage controlled oscillator 133 of the broadcast transmission system 100 described above, and clock synchronization is achieved.

Furthermore, in the counters 233a, 233b, 233c, the system time clock synchronized with NTP_CR is generated. The system time clock conforms to the system time clock generated in the counters 134a, 134b, 134c of the broadcast transmission system 100 described above. Therefore, as described above, the period information acquired based on the clock of 90 KHz output from the 9-bit counter 134a and used to calculate the decoding time and the presentation time per presentation unit of the video signal is inserted into the f-MP4 stream, thereby achieving presentation synchronization.

Furthermore, in the demultiplexer 231, the MPD file is extracted from the packet including the MPD file. The MPD file is supplied to the MPD parser 236. In the MPD parser 236, the MPD file is parsed, and information of "Period@start", "SegmentTemplete@timescale", "SegmentTimeline S@t" is taken out and supplied to the DTS/PTS calculator 238.

Furthermore, in the demultiplexer 231, the initialization segment (IS) and the media segment (MS) are extracted. In this case, after the initialization segment (IS) is extracted, and then the media segment (MS) transmitted subsequently is extracted.

Moreover, in the demultiplexer 231, initialization information of decoding processing is taken out from the initialization segment (IS), and supplied to the video decoding processing unit 240 via the decoder buffer 235. In the video decoding processing unit 240, for example, initialization is performed based on the initialization information of decoding processing.

Furthermore, in the demultiplexer 231, each of the extracted media segments (MS) is packetized, and the encoded video data of each picture included in the "mdat" box of each movie fragment (Movie Fragment) is taken out. The encoded video data of each picture thus taken out is temporarily accumulated in the decoder buffer 235.

Moreover, in the demultiplexer 231, the "moof" box in each movie fragment (Movie Fragment) of each of the extracted media segment (MS) is extracted. The "moof" box is supplied to the moof parser 237. In the moof parser 237, information of "base Media Decode Time" included in the "tfdt" box inside the "moof" box is taken out. Furthermore, in the moof parser 237, information of "trun@sample_duration" and "trun@sample_composition_time_offset" included in the "trun" box inside the "moof" box is taken out. The information thus taken out is supplied to the DTS/PTS calculator 238.

The DTS/PTS calculator 238 calculates the decoding time (DTS: Decoding Time Stamp) and the presentation time (PTS: Presentation TimeStamp) corresponding to the encoded video data of each picture accumulated in the decoder buffer 235 based on the information supplied from the MPD parser 236 and the information supplied from the moof parser 237.

In this case, the decoding time and the presentation time are respectively calculated in a manner divided into a second section and a subsecond section indicated by the count value of the clock of 90 KHz. Here, "Period@start" is NTP-based, but is assumed to have second precision. Additionally, other parameters (information) are all indicated by the count value of the clock of 90 KHz. Therefore, the DTS/PTS calculator 238 divides, by 90000, a value obtained by adding other parameters, and a quotient of the division is added to "Period@start" having second precision, and set as the high 32 bits, and then a remainder of the division is set as the low 17 bits.

A calculation formula of the high 32 bits (second section) and the low 17 bits (subsecond section) in the decoding time (DTS) and the presentation time (PTS) is shown below.

The calculation formula for the decoding time (DTS) is as follows.
Decoding Time > High 32 bits: Period@start+Period@start+(Segment-Timeline s@t+BaseMediaDecodeTime+Σ(SampleDuration))/90000
>
> Low 17 bits: Mod (SegmentTimeline s@t+BaseMediaDecodeTime+Σ(SampleDuration), 90000)

Furthermore, the calculation formula for the presentation time (PTS) is as follows.
Presentation Time > High 32 bits: Period@start+Period@start+(Segment-Timeline s@t+BaseMediaDecodeTime+Σ(SampleDuration)+CompositionTimeOffset)/90000
>
> Low 17 bits: Mod (SegmentTimeline s@t+BaseMediaDecodeTime+Σ(SampleDuration)+CompositionTimeOffset, 90000)

As described above, the system time clock (time information) generated in the counters 233a, 233b, 233c is synchronized with the system time clock (time information) generated in the counters 134a, 134b, 134c of the broadcast transmission system 100. The count value (second section) of the 32-bit counter 233c and the count value of the 17-bit counter 233b (subsecond section and count value of clock of 90 KHz) are supplied to the timing controller 239. Furthermore, in the timing controller 239, the decoding time (DTS) and the presentation time (PTS) calculated in the DTS/PTS calculator 238 and corresponding to the encoded video data of each picture accumulated in the decoder buffer 235 are supplied.

In the timing controller 239, a decode command and a presentation command are provided to the video decoding processing unit 238 relative to the encoded video data of each picture accumulated in the decoder buffer 235. In this case, the timing controller 239 refers to the count value of the counter 233c (second section) and the count value of the counter 233b (subsecond section), and provides these commands the commands at the respective timing based on the decoding time (DTS) and the presentation time (PTS) supplied from the DTS/PTS calculator 238. Meanwhile, in this case, the timing controller 239 determines whether time has reached the decoding time (DTS) or the presentation time (PTS) by performing matching of the second section and subsecond section.

In the video decoding processing unit 240, decoding processing is applied to the encoded video data of each picture accumulated in the decoder buffer 235 based on the command from the timing controller 239, and outputs decoded video data. In this case, the video decoding processing unit 238 takes in, from the decoder buffer 235, the encoded video data of a picture to be processed in accordance with the decode command, and then outputs the decoded video data in accordance with the presentation command.

Figure 16:
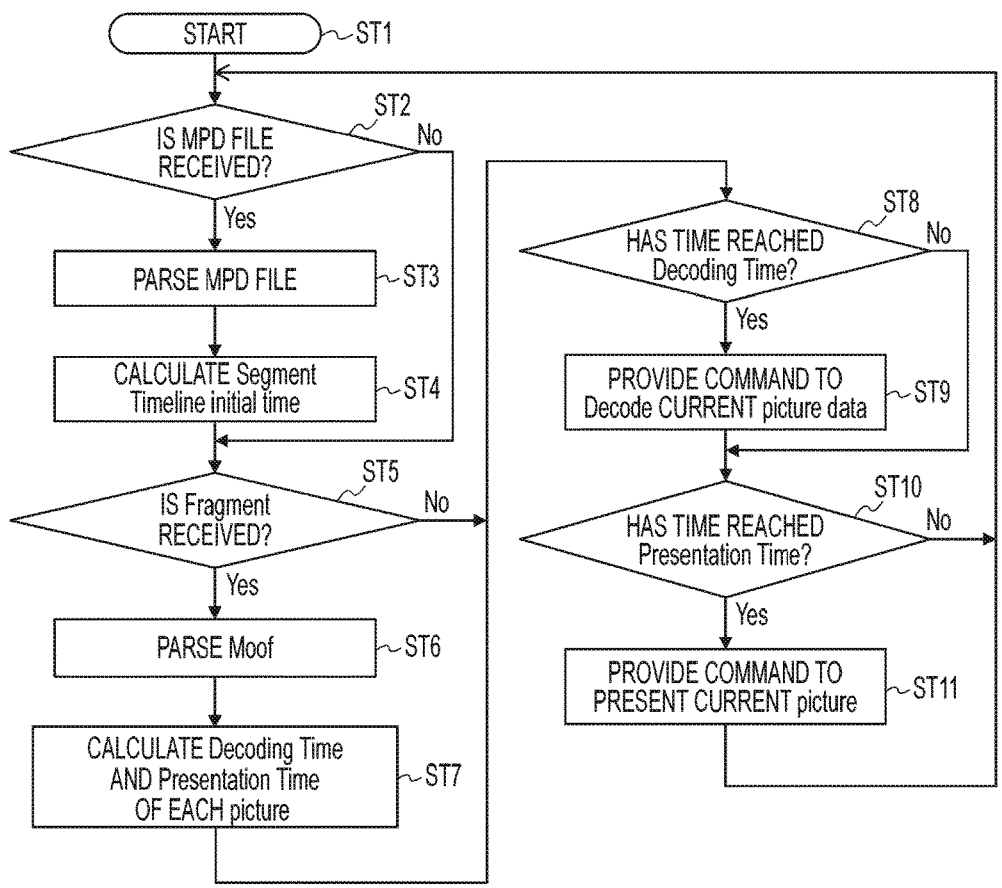
FIG. 16 is a flowchart illustrating an exemplary processing procedure of synchronized control processing in the receiver.

FIG. 16 is a flowchart illustrating an exemplary processing procedure of synchronized control processing in the receiver 200 described above. The receiver 200 starts processing in Step ST1. After that, the receiver 200 determines, in Step ST2, whether an MPD file is received. When the MPD file is received, the receiver 200 parses the MPD file in Step ST3 and calculates "Segment Timeline Initial Time" that is a start time of SegmentTimeline based on the information of "Period@start", "SegmentTemplete@timescale", and "SegmentTimeline S@t" obtained as a result of parsing in Step ST4. The receiver 200 proceeds to the processing in Step ST5 after the processing in Step ST4. When no MPD file is received in Step ST3, the receiver 200 immediately proceeds to the processing in Step ST5.

In Step ST5, the receiver 200 determines whether a movie fragment (Movie Fragment) constituting the media segment (MS) is received. When the movie fragment is received, the "moof" box is parsed in Step ST6. Then, the receiver 200 calculates, in Step ST7, the decoding time (DTS) and the presentation time (PTS) of each picture included in the movie fragment (Movie Fragment) based on the "Segment Timeline Initial Time" calculated in Step ST4, and the information of "base Media decode time", "trun@sample_duration", and "trun@sample_composition_time_offset" obtained as the result of parsing therein.

Next, the receiver 200 determines, in Step ST8, whether the time has reached the decoding time (DTS). When the time has reached the decoding time (DTS), the receiver 200 provides, in Step ST9, a decode command relative to encoded video data of a current picture to the video decoding processing unit 238 from the timing controller 239. After that, the receiver 200 proceeds to the processing in Step ST10. Furthermore, when the time has not reached the decoding time (DTS) in Step ST8, the receiver 200 immediately returns to the processing in Step ST10.

In Step ST10, the receiver 200 determines whether the time has reached the presentation time (PTS). When the time has reached the presentation time (PTS), the receiver 200 provides, in Step ST11, a presentation command for the current picture, namely, an output command for the decoded video data to the video decoding processing unit 238 from the timing controller 239. The receiver 200 returns to the processing in Step ST2 after the processing in Step ST11. Furthermore, when the time has not reached the presentation time (PTS) in Step ST10, the receiver 200 immediately returns to the processing in Step ST10.

As described above, in the transmitting/receiving system 10 illustrated in FIG. 1, the stream to be carried on a broadcast wave transmitted from the broadcast transmission system 100 includes a packet having the time information including the frequency information of the clock of 27 MHz synchronized with the time information acquired from the time information server. Therefore, the receiving side can generate the clock of 27 MHz (system clock) same as the transmitting side based on the time information, and clock synchronization can be achieved.

Furthermore, in the transmitting/receiving system 10 illustrated in FIG. 1, the period information is acquired based on the clock of 90 KHz obtained in the clock unit. The period information is to be inserted into the media segment (transmission media packet) included in the stream to be carried on a broadcast wave transmitted from the broadcast transmission system 100, and used to calculate the decoding time and the presentation time per presentation unit of the transmission media such as video and audio. Therefore, on the receiving side, presentation synchronization can be achieved based on: the time information including the frequency information of the clock of 27 MHz generated based on the time information included in the stream; and the decoding time (DTS) and the presentation time (PTS) calculated by the period information inserted into the media segment per presentation unit of the transmission medium.

[2. MODIFIED EXAMPLE]

Meanwhile, in the above-described embodiment, described is the example in which the stream to be carried on a broadcast wave is an f-MP4 format stream. In the present technology, the stream to be carried on a broadcast wave is not limited to the f-MP4 format stream, and a case of adopting another equivalent stream can also be applied in the same manner.

Furthermore, in the above-described embodiment, described is the example in which the clock of 27 MHz is generated in the voltage controlled oscillator 133 of the broadcast transmission system 100 and voltage controlled oscillator 232 of the receiver 200. Additionally, in the above-described embodiment, described is the example in which the F-MP4 packetizer 139 of the broadcast transmission system 100 generates the period information to be inserted into the transmission media packet (media segment) based on the clock of 90 KHz. However, the present technology is not constantly limited to the above-described 27 MHz and 90 KHz, and a case of adopting another frequency can also be applied in the same manner.

Furthermore, the present technology can have following configurations as well.

(1) A transmission device including:

a clock generation unit adapted to generate a clock of a first frequency synchronized with time information acquired from a time information server;

a time information generation unit adapted to generate time information synchronized with time information acquired from the time information server and including frequency information of the clock of the first frequency generated in the clock generation unit; an encoding unit adapted to encode a transmission medium;

a packetizer adapted to fragment, in a predetermined unit, the transmission medium encoded in the encoding unit, and generate a transmission media packet including each fragment; and a transmission unit adapted to perform transmission by carrying, on a broadcast wave, a stream that includes, on time division basis, the transmission media packet generated in the packetizer, a time information packet having the time information generated in the time information generation unit, and a control signal packet including a control signal.

(2) The transmission device according to (1) above, wherein the packetizer acquires period information to be inserted into the transmission media packet and used to calculate a decoding time and a presentation time per presentation unit of the transmission medium based on a clock of a second frequency obtained in the time information generation unit.

(3) The transmission device according to (2) above, wherein the first frequency is 27 MHz, and the second frequency is 90 KHz.

(4) The transmission device according to (2) or (3), wherein the transmission media packet generated in the packetizer is a media segment including predetermined number of movie fragments, and the packetizer acquires the period information to be inserted into a tfdt box and a trun box inside a moof box constituting the movie fragment.

(5) The transmission device according to (1) above, wherein the first frequency is 27 MHz.

(6) The transmission device according to (5) above, wherein the time information generation unit includes: a 9-bit counter to count the clock of 27 MHz generated in the clock generation unit and divide a frequency by 300; a 17-bit counter to count frequency-divided output from the 9-bit counter and divide a frequency by 90000; and a 32-bit counter to count frequency-divided output from the 17-bit counter.

(7) A transmitting method including:

a clock generation step to generate a clock of a first frequency synchronized with time information acquired from a time information server;

a time information generation step to generate time information synchronized with time information acquired from the time information server and including frequency information of the clock of the first frequency generated in the clock generation step;

an encoding step to encode a transmission medium;

a packetizing step to fragment, in a predetermined unit, the transmission medium encoded in the encoding step, and generate a transmission media packet including each fragment; and a transmission step to transmit a transmission signal that includes, on time division basis, the transmission media packet generated in the packetizing step, a packet having time information generated in the time information generation step, and a packet including a control signal.

(8) A reception device including:

a receiving unit adapted to receive a broadcast wave carrying a stream that includes, on time division basis, a transmission media packet including a fragment obtained by fragmenting an encoded transmission medium, a time information packet including frequency information of a clock of a first frequency and having time information synchronized with time information acquired from a time information server, and a control signal packet having a control signal;

a clock generation unit adapted to generate a clock of the first frequency based on time information included in the time information packet;

a time information generation unit adapted to generate time information including frequency information of the clock of the first frequency generated in the clock generation unit and synchronized with time information acquired from the time information server;

a time calculator adapted to calculate a decoding time and a presentation time per presentation unit of the transmission medium based on period information inserted into the transmission media packet; and a processing unit adapted to process, per presentation unit, an encoded transmission medium included in the transmission media packet received in the receiving unit based on the decoding time and the presentation time calculated in the time calculator and the time information generated in the time information calculator.

(9) The reception device according to (8) above, wherein the first frequency is 27 MHz.

(10) The reception device (9) above, wherein the time information generation unit includes: a 9-bit counter to count the clock of 27 MHz generated in the clock generation unit and divide a frequency by 300; a 17-bit counter to count frequency-divided output from the 9-bit counter and divide a frequency by 90000; and a 32-bit counter to count frequency-divided output from the 17-bit counter, and generates time information having a second section and a subsecond section indicated by a count value of a clock of 90 KHz, and the time calculator calculates each of the decoding time and the presentation time in a manner divided into the second section and the subsecond section indicated by a count value of a clock of 90 KHz.

(11) The reception device according to any one of (8) to (10) above, wherein a transmission media packet received in the receiving unit is a media segment including predetermined number of movie fragments, period information used to calculate a decoding time and a presentation time per presentation unit of the transmission medium is inserted into a tfdt box and a trun box inside a moof box constituting the movie fragment.

(12) A receiving method including:

a receiving step to receive a broadcast wave carrying a stream that includes, on time division basis, a transmission media packet including a fragment obtained by fragmenting an encoded transmission medium, a time information packet including frequency information of a clock of a first frequency and having time information synchronized with time information acquired from a time information server, and a control signal packet including a control signal;

a time calculation step to calculate a decoding time and a presentation time per presentation unit of the transmission medium based on period information inserted into the transmission media packet;

a clock generation step to generate a clock of the first frequency based on time information included in the time information packet;

a time information generation step to generate time information synchronized with time information acquired from the time information server and including frequency information of the clock of the first frequency generated in the clock generation step; and a processing step to process, per presentation unit, an encoded transmission medium included in the transmission media packet received in the receiving step based on the decoding time and the presentation time calculated in the time calculator and the time information generated in the time information generation step.

REFERENCE SIGNS LIST

10 Image transmitting/receiving system
100 Broadcast transmission system
131 NTP/IP interface
132a, 132b 32-bit register
133 Voltage controlled oscillator
134a 9-bit counter
134b 17-bit counter
134c 32-bit counter
135 Bit transform unit
136 Comparator
137 NTP-CR packetizer
138 Video encoding processing unit
139 f-MP4 packetizer
140 Encoder buffer
141 MPD generator
142 Multiplexer
150 Period information acquisition unit
151 90 KHz counter
152, 153, 155 Latch circuit
154 Subtractor
200 Receiver
231 Demultiplexer
232 Voltage controlled oscillator
233a 9-bit counter
233b 17-bit counter
233c 32-bit counter
234 Comparator
235 Decoder buffer
236 MPD parser
237 Moof parser
238 DTS/PTS calculator
239 Timing controller
240 Video decoding processing unit

The invention claimed is:

1. A transmission device comprising:
circuitry configured to:
synchronize a clock of a first frequency with information acquired from a server;
generate time information including frequency information of the clock of the first frequency synchronized;
encode a transmission medium;
fragment the transmission medium encoded, and generate a transmission media packet including each fragmented transmission medium;
acquire period information to be inserted into the transmission media packet and used to calculate a decoding time and a presentation time per presentation unit of the transmission medium based on a second frequency; and
transmit by carrying a stream that includes, on a time division basis, (i) the transmission media packet generated, (ii) a time information packet that is different from the transmission media packet, the time information packet having the time information that includes the frequency information of the clock of the first frequency synchronized, and (iii) a control signal packet including a control signal.

2. The transmission device according to claim 1, wherein the first frequency is 27 MHz, and the second frequency is 90 kHz.

3. The transmission device according to claim 1, wherein the transmission media packet generated is a media segment including a predetermined number of movie fragments,
the circuitry is further configured to acquire the period information to be inserted into a track fragment decode time box and a track fragment run box inside a movie fragment box constituting the movie fragments.

4. The transmission device according to claim 1, wherein the first frequency is 27 MHz.

5. The transmission device according to claim 4, wherein the circuitry is further configured to include: a 9-bit counter to count the clock of 27 MHz and divide a frequency by 300; a 17-bit counter to count a frequency-divided output from the 9-bit counter and divide a frequency by 90000; and a 32-bit counter to count a frequency-divided output from the 17-bit counter.

6. A transmitting method comprising:
synchronizing a clock of a first frequency with information acquired from a server;
generating time information including frequency information of the clock of the first frequency synchronized;
encoding a transmission medium;
fragmenting the transmission medium encoded;
generating a transmission media packet including each fragmented transmission medium;
acquiring period information to be inserted into the transmission media packet and used to calculate a decoding time and a presentation time per presentation unit of the transmission medium based on a second frequency; and
transmitting by carrying a stream that includes, on a time division basis, (i) the transmission media packet generated, (ii) a time information packet that is different from the transmission media packet, the time information packet having the time information that includes the frequency information of the clock of the first frequency synchronized, and (iii) a control signal packet including a control signal.

7. A reception device comprising:
circuitry configured to:
receive a stream that includes, on a time division basis, (i) a transmission media packet including a fragment obtained by fragmenting an encoded transmission medium, (ii) a time information packet that is different from the transmission media packet, the time information packet having time information that includes frequency information of a clock of a first frequency synchronized with information acquired from a server, and (iii) a control signal packet having a control signal;
generate the clock of the first frequency based on the time information included in the time information packet;
generate the time information including the frequency information of the clock of the first frequency synchronized with the information acquired from the server;
calculate a decoding time and a presentation time per presentation unit of the transmission medium based on period information inserted into the transmission media packet based on a second frequency; and
process the encoded transmission medium derived from the transmission media packet received based on the decoding time and the presentation time calculated and the time information generated.

8. The reception device according to claim 7, wherein the first frequency is 27 MHz.

9. The reception device according to claim 8, wherein
the circuitry is further configured to: include a 9-bit counter to count the clock of 27 MHz and divide a frequency by 300; a 17-bit counter to count a frequency-divided output from the 9-bit counter and divide a frequency by 90000; and a 32-bit counter to count a frequency-divided output from the 17-bit counter;
generate additional time information having a second section and a subsecond section indicated by a count value of a clock of 90 kHz; and
calculate each of the decoding time and the presentation time in a manner divided into the second section and the subsecond section indicated by the count value of the clock of 90 kHz.

10. The reception device according to claim 7, wherein
the transmission media packet received is a media segment including a predetermined number of movie fragments, and
the period information used to calculate the decoding time and the presentation time per presentation unit of the transmission medium is inserted into a track fragment decode time box and a track fragment run box inside a movie fragment box constituting the movie fragments.

11. A receiving method comprising:
receiving a stream that includes, on a time division basis, (i) a transmission media packet including a fragment obtained by fragmenting an encoded transmission medium, (ii) a time information packet that is different from the transmission media packet, the time information packet having time information that includes frequency information of a clock of a first frequency synchronized with information acquired from a server, and (iii) a control signal packet having a control signal;
calculating a decoding time and a presentation time per presentation unit of the transmission medium based on period information inserted into the transmission media packet based on a second frequency;
generating the clock of the first frequency based on the time information included in the time information packet;
generating the time information including the frequency information of the clock of the first frequency synchronized with the information acquired from the server;
processing the encoded transmission medium derived from the transmission media packet received based on the decoding time and the presentation time calculated and the time information generated.

12. The receiving method according to claim 11, wherein the first frequency is 27 MHz.

13. The receiving method according to claim 12, further comprising:
counting, by a 9-bit counter, the clock of 27 MHz and divide a frequency by 300;
counting, by a 17-bit counter, a frequency-divided output from the 9-bit counter and dividing a frequency by 90000;
counting, by a 32-bit counter, a frequency-divided output from the 17-bit counter;
generating additional time information having a second section and a subsecond section indicated by a count value of a clock of 90 kHz; and
calculating each of the decoding time and the presentation time in a manner divided into the second section and the subsecond section indicated by the count value of the clock of 90 kHz.

14. The receiving method according to claim 11, wherein the transmission media packet received is a media segment including a predetermined number of movie fragments, further comprising:
inserting the period information used to calculate the decoding time and the presentation time per presentation unit of the transmission medium into a track fragment decode time box and a track fragment run box inside a movie fragment box constituting the movie fragments.

15. A non-transitory computer readable medium storing computer readable instructions thereon that, when executed by a computer, causes the computer to perform the receiving method according to claim 11.

* * * * *